United States Patent [19]

Yeske et al.

[11] Patent Number: 5,574,122
[45] Date of Patent: Nov. 12, 1996

[54] LOW SURFACE ENERGY POLYISOCYANATES AND THEIR USE IN ONE- OR TWO-COMPONENT COATING COMPOSITIONS

[75] Inventors: Philip E. Yeske; Edward P. Squiller, both of Pittsburgh, Pa.; William E. Slack, Moundsville, W. Va.

[73] Assignee: Bayer Corporation, Pittsburgh, Pa.

[21] Appl. No.: 536,556

[22] Filed: Sep. 29, 1995

[51] Int. Cl.$^6$ ............ C08G 18/61; C08G 18/77; C07C 269/02; C07F 7/10
[52] U.S. Cl. .......... 528/28; 252/182.14; 252/182.2; 252/182.21; 252/182.22; 528/45; 528/59; 528/67; 528/73; 556/414; 556/420; 556/421; 560/25; 560/26; 560/115; 560/158; 560/330; 560/336; 560/355
[58] Field of Search .......... 252/182.14, 182.2, 252/182.21, 182.22; 528/28, 45, 59, 67, 73; 556/414, 420, 421; 560/25, 115, 158, 336, 355, 26, 330

[56] References Cited

U.S. PATENT DOCUMENTS

| | | | |
|---|---|---|---|
| 3,932,337 | 1/1976 | Shah | 524/264 |
| 4,096,162 | 6/1978 | Windemuth et al. | 556/420 |
| 4,163,830 | 8/1979 | Windemuth et al. | 521/111 |
| 4,590,224 | 5/1986 | Frisch, Jr. | 521/155 |
| 4,962,178 | 10/1990 | Harisiades | 528/33 |

Primary Examiner—James J. Seidleck
Assistant Examiner—Rabon Sergent
Attorney, Agent, or Firm—Joseph C. Gil; Thomas W. Roy

[57] ABSTRACT

The present invention is directed to a polyisocyanate mixture i) having an NCO content of 5 to 35% by weight and prepared from an organic diisocyanate, ii) containing up to 25% by weight of isocyanurate groups (calculated as $N_3$, $C_3$, $O_3$, MW 126), iii) containing allophanate groups in an amount such that there are more equivalents of allophanate groups than urethane or urea groups and such that the polyisocyanate mixture remains stable and homogeneous in storage for 3 months at 25° C. and iv) containing siloxane groups (calculated as SiO, MW 44) in an amount of 0.002 to 50% by weight, wherein the preceding percentages are based on the solids content of the polyisocyanate mixture, excluding any unreacted organic diisocyanate, and wherein the siloxane groups are incorporated by reacting an isocyanate group with a compound containing one isocyanate-reactive group directly attached to a carbon atom and one or more siloxane groups. The present invention is also directed to a process for the production of this polyisocyanate mixture and to its use, optionally in blocked form, as an isocyanate component in one- or two-component coating compositions.

20 Claims, No Drawings

5,574,122

LOW SURFACE ENERGY POLYISOCYANATES AND THEIR USE IN ONE- OR TWO-COMPONENT COATING COMPOSITIONS

BACKGROUND OF THE INVENTION

1. Field of the Invention

The present invention is directed to low surface energy polyisocyanates which contain allophanate groups, siloxane groups and optionally isocyanurate groups, to a process for their preparation by allophanatizing the isocyanate groups of organic diisocyanates in the presence of isocyanate-reactive compounds containing siloxane groups, and to their use in one- and two-component coating compositions.

2. Description of the Prior Art

Polyurethane coating compositions containing a polyisocyanate component, in either blocked or unblocked form and an isocyanate-reactive component, generally a high molecular weight polyol, are well known.

Although coatings prepared from these compositions possess many valuable properties, one property, in particular, which needs to be improved is the surface quality. It can be difficult to formulate coating compositions to obtain a coating having a smooth surface as opposed to one containing surface defects such as craters, etc.

It is believed that these difficulties are related to the high surface tension of the two-component coating compositions. Another problem caused by the high surface tension is the difficulty in cleaning the coatings. Regardless of their potential application area, there is a high likelihood that the coatings will be subjected to stains, graffiti, etc.

Accordingly, it is an object of the present invention to provide coating compositions which have reduced surface tension and, thus, are suitable for the production of coatings having lower surface energies and improved surfaces. It is an additional object of the present invention to provide coating compositions which have improved cleanability. It is a final object of the present invention to provide coating compositions which satisfy these requirements without substantially affecting the other valuable properties of the known polyurethane coatings.

Surprisingly, these objectives may be achieved by formulating coating compositions with the polyisocyanates according to the present invention containing allophanate groups, siloxane groups and optionally isocyanurate groups which are described hereinafter.

U.S. Pat. No. 4,590,224 is directed to the production of fully reacted polymers, primarily in the form of molded articles or foams, which are prepared by reacting a polyisocyanate with a polysiloxane polyahl in the presence of a trimerization catalyst. In addition to the oligomerization of the polyisocyanate to form isocyanurate groups, a portion of the isocyanate groups will react with the polyahl to form urethane or urea groups depending upon the type of polyahl. This patent does not suggest preparing the polyisocyanate component from siloxane compounds containing one isocyanate-reactive group as required by the present invention. In addition, this patent does not suggest the incorporation of allophanate groups into the polyisocyanate component and certainly does not recognize the importance of incorporating allophanate groups to maintain the clarity of polyurethane coatings.

The incorporation of fluorine into either polyisocyanates containing allophanate groups and isocyanurate groups or polyisocyanates containing allophanate groups in order to reduce the surface tension of the polyisocyanates and the surface energy of the resulting polyurethane coatings is disclosed in copending applications, U.S. Ser. Nos. 08/306,553 and 08/359,777, respectively.

SUMMARY OF THE INVENTION

The present invention is directed to a polyisocyanate mixture i) having an NCO content of 5 to 35% by weight and prepared from an organic diisocyanate, ii) containing up to 25% by weight of isocyanurate groups (calculated as $N_3, C_3, O_3$, MW 126), iii) containing allophanate groups in an amount such that there are more equivalents of allophanate groups than urethane or urea groups and such that the polyisocyanate mixture remains stable and homogeneous in storage for 3 months at 25° C. and iv) containing siloxane groups (calculated as SiO, MW 44) in an amount of 0.002 to 50% by weight, wherein the preceding percentages are based on the solids content of the polyisocyanate mixture, excluding any unreacted organic diisocyanate, and wherein the siloxane groups are incorporated by reacting an isocyanate group with a compound containing one isocyanate-reactive group directly attached to a carbon atom and one or more siloxane groups.

The present invention is also directed to a process for the production of a polyisocyanate mixture i) having an NCO content of 5 to 35% by weight and prepared from an organic diisocyanate, ii) containing up to 25% by weight of isocyanurate groups (calculated as $N_3, C_3, O_3$, MW 126), iii) containing allophanate groups in an amount such that there are more equivalents of allophanate groups than urethane or urea groups and such that the polyisocyanate mixture remains stable and homogeneous in storage for 3 months at 25° C. and iv) containing siloxane groups (calculated as SiO, MW 44) in an amount of 0.002 to 50% by weight, wherein the preceding percentages are based on the solids content of the polyisocyanate mixture, excluding any unreacted organic diisocyanate, by a) reacting a portion of the isocyanate groups of an organic diisocyanate with 0.01 to 500 millimoles, per mole of organic diisocyanate, of a compound containing one isocyanate-reactive group directly attached to a carbon atom and one or more siloxane groups and optionally a non-siloxane-containing monofunctional or polyfunctional alcohol to form urethane and optionally urea groups, provided that at least one of the isocyanate-reactive compounds contains hydroxyl groups, b) adding an allophanatization catalyst and optionally a trimerization catalyst prior to, during or after step a), c) converting a sufficient amount of the urethane groups formed in step a) to allophanate groups to satisfy the requirements of iii), d) terminating the allophanatization and trimerization reaction at the desired NCO content by adding a catalyst poison and/or by thermally deactivating the catalyst, and e) optionally removing unreacted organic diisocyanate.

The present invention also relates to the use of the polyisocyanate mixture, optionally in blocked form, as an isocyanate component in one- or two-component coating compositions.

DETAILED DESCRIPTION OF THE INVENTION

In accordance with the present invention the term "(cyclo)aliphatically bound isocyanate groups" means aliphatically and/or cycloaliphatically bound isocyanate groups. The term "monoalcohol" means a compound containing one aliphatically, cycloaliphatically, araliphatically or aromatically bound hydroxyl group.

In a preferred embodiment of the present invention the polyisocyanate mixtures are prepared from organic diisocyanates represented by the formula $$R(NCO)_2$$

wherein R represents an organic group obtained by the removing the isocyanate groups from an organic diisocyanate having aromatically or preferably (cyclo)aliphatically bound isocyanate groups and a molecular weight of 140 to 400. Preferred diisocyanates for the process according to the invention are those represented by the above formula wherein R represents a divalent aliphatic hydrocarbon group having from 4 to 18 carbon atoms, a divalent cycloaliphatic hydrocarbon group having from 5 to 15 carbon atoms, a divalent aromatic hydrocarbon group having 6 to 15 carbon atoms or a divalent araliphatic hydrocarbon group having from 7 to 15 carbon atoms.

Examples of the organic diisocyanates which are particularly suitable for the process include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate, or IPDI), (4,4'-and/or 2,4'-diisocyanato-dicyclohexylmethane, 1,3- and 1,4-bis(isocyanato-methyl)-cyclohexane, bis-(4-isocyanato-3-methyl-cyclohexyl)-methane, xylylene diisocyanate, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 2,4- and/or 2,6-toluene diisocyanate, 2,4- and/or 4,4'-diphenyl methane diisocyanate. Mixtures of these diisocyanates may also be used. Preferred diisocyanates are 1,6-hexamethylene diisocyanate, isophorone diisocyanate and bis-(4-isocyanato-cyclohexyl)-methane; 1,6-hexamethylene diisocyanate is especially preferred.

It is also possible in accordance with the present invention to use blends of the previously mentioned diisocyanates with monoisocyanates or polyisocyanates having 3 or more isocyanate groups.

Suitable methods for preparing the allophanate group containing polyisocyanates are known and described in U.S. Pat. Nos. 3,769,318, 4,160,080 and 4,177,342 and 4,738,991, the disclosures of which are herein incorporated by reference. The allophanatization reaction may be conducted at a temperature of 50° to 250° C., preferably 60° to 150° C. and more preferably 70° to 120° C. The reaction may be terminated by reducing the reaction temperature, by removing the catalyst, e.g., by applying a vacuum, or by the addition of a catalyst poison. After the reaction is terminated, unreacted monomeric diisocyanates may be removed, e.g., by thin film evaporation.

The allophanatization of the starting diisocyanate mixture may be carried out in the absence or in the presence of solvents which are inert to isocyanate groups. Depending on the area of application of the products according to the invention, low to medium-boiling solvents or high-boiling solvents can be used. Suitable solvents include esters such as ethyl acetate or butyl acetate; ketones such as acetone or butanone; aromatic compounds such as toluene or xylene; halogenated hydrocarbons such as methylene chloride and trichloroethylene; ethers such as diisopropylether; and alkanes such as cyclohexane, petroleum ether or ligroin.

Instead of just using catalysts that promote the formation of allophanate groups, it is also possible in accordance with the present invention to also use catalysts that promote the formation of isocyanurate groups, or to use catalysts that promote the formation of allophanate groups and isocyanurate groups. Suitable methods and catalysts for the preparation of polyisocyanates containing isocyanurate groups and allophanate groups are known and described in U.S. Pat. Nos. 5,124,427, 5,208,334, 5,235,018 and 5,444,146, the disclosures of which are herein incorporated by reference. The trimerization of the starting diisocyanate mixture may be carried out in the absence or in the presence of solvents which are inert to isocyanate groups, such as those previously described.

In accordance with the present invention urethane and/or urea groups, preferably urethane groups, are incorporated into the polyisocyanates by the use of compounds containing one isocyanate-reactive group directly attached to a carbon atom, preferably a hydroxyl group, and one or more siloxane groups, preferably in the form of dimethyl siloxane groups, $-Si(CH_3)_2O-$.

Examples of these compounds are those corresponding to the formula $$Y-R^1-X-[Si(R^2)_2O-]_n-[Si(R^2)_2-X]_m-R^1-H$$

wherein $R^1$ represents an optionally inertly substituted, divalent hydrocarbon radical, preferably an alkylene radical (such as methylene, ethylene or propylene) or a polyoxyalkylene group (such as a polyoxyethylene or polyoxypropylene group), $R^2$ represents hydrogen or an optionally inertly substituted lower alkyl, phenyl or benzyl group, preferably ethyl or methyl, more preferably methyl, X represents a linkage between an $R^1$ group and a Si atom, e.g., a covalent bond, $-O-$ or $-COO-$, Y is an isocyanate-reactive group, preferably a hydroxyl group or a primary or secondary amino group, more preferably a hydroxyl group, m is 0 or 1 and n is an integer from 1 to 1,000, preferably 2 to 100 and more preferably 4 to 15.

Inert substituents are those that do not interfere with the reaction of the siloxane compound with the polyisocyanate or the allophanate and/or trimerization reaction of the isocyanate groups. Examples include halogen atoms such as fluorine.

An example of compounds in which $R^1$ represents an oxyalkylene group are compounds corresponding to the formula $$Y-(CHR^3-CH_2O-)_o-(R^4)_m-[Si(R^2)_2O-]_n-[Si(R^2)_2-X']_m-R^4-H$$

wherein

R², Y, m and n are as defined above,

R³ is hydrogen or an alkyl group having 1 to 12 carbon atoms, preferably hydrogen or methyl, R⁴ represents an optionally inertly substituted, divalent hydrocarbon radical, preferably an alkylene radical (such as methylene, ethylene, propylene or butylene), X' represents a linkage between an R⁴ group and a Si atom, e.g., a covalent bond, —O— or —COO—, and o is an integer from 1 to 1,000, preferably 2 to 100 and more preferably 4 to 15.

These siloxane compounds are prepared by reacting the appropriate siloxane with an amount of an alkylene oxide (preferably ethylene or propylene oxide) sufficient to prepare a compound having the desired siloxane content. Amino or alkylene amino groups are introduced by aminating the resulting hydroxyl-terminated compound in known manner.

Other suitable siloxane-containing compounds may be linear, branched or cyclic and have a molecular weight (number average molecular weight as determined by gel permeation chromatography using polystyrene as standard) of up to 50,000, preferably up to 10,000, more preferably up to 6000 and most preferably up to 2000. These compounds generally have OH numbers of greater than 5, preferably greater than 25 and more preferably greater than 35. Compounds of this type are disclosed in "Silicon Compounds", 5th Edition, which is available from Hüls America, Inc.

To prepare the polyisocyanates mixtures according to the invention the minimum ratio of siloxane-containing compounds to diisocyanate is about 0.01 millimoles, preferably about 0.1 millimoles and more preferably about 1 millimole of siloxane-containing compounds for each mole of diisocyanate. The maximum amount of siloxane-containing compounds to diisocyanate is about 500 millimoles, preferably about 100 millimoles and more preferably about 20 millimoles of siloxane-containing compounds for each mole of diisocyanate. The amount of the siloxane is selected such that the resulting polyisocyanate mixture contains a minimum of 0.002% by weight, preferably 0.01% by weight and more preferably 0.1% by weight, of siloxane groups (calculated as SiO, MW 44), based on solids, and a maximum of 50% by weight, preferably 10% by weight, more preferably 7% and most preferably 3% by weight of siloxane groups, based on solids.

In addition to the previously described compounds containing siloxane groups, other monofunctional or polyfunctional alcohols, preferably monoalcohols, which do not contain siloxane groups may also be used to adjust the properties of the final products. For example, monoalcohols which do not contain siloxane groups may be used to reduce the viscosity of the polyisocyanate mixtures. Suitable monoalcohols of this type have been disclosed in U.S. Pat. Nos. 5,124,427, 5,208,334, 5,235,018 and 5,444,146, the disclosures of which have previously been incorporated by reference.

When the siloxane compounds do not contain sufficient hydroxyl groups to subsequently meet the required allophanate group contents, e.g., when amino-functional siloxanes are used, it is necessary to use these optional non-siloxane containing alcohols. These alcohols react with the polyisocyanate component to form urethane groups and subsequently the allophanate groups which are essential to the present invention.

Examples of suitable monoalcohols include methanol, ethanol, n-propanol, isopropanol, n-butanol, 2-butanol, isobutanol, tert. butanol, n-pentanol, 2-hydroxy pentane, 3-hydroxy pentane, the isomeric methyl butyl alcohols, the isomeric dimethyl propyl alcohols, neopentyl alcohol, n-hexanol, n-heptanol, n-octanol, n-nonanol, 2-ethyl hexanol, trimethyl hexanol, cyclohexanol, benzyl alcohol, phenol, the cresols, the xylenols, the trimethylphenols, decanol, dodecanol, tetradecanol, hexadecanol, octadecanol, 2,6,8-trimethylnonanol, 2-t-butyl-cyclohexanol, 4-cyclohexyl-1-butanol, 2,4,6,-trimethyl benzyl alcohol, branched chain primary alcohols and mixtures thereof (which are available from Henkel under the Standamul trademark) and mixtures of linear primary alcohols (which are available from Shell under the Neodol trademark).

Preferred ether-containing monoalcohols include ethoxy methanol, methoxy ethanol, ethoxy ethanol, the isomeric methoxy or ethoxy propanols, the isomeric propoxy methanols and ethanols, the isomeric methoxy butanols, the isomeric butoxy methanols, furfuralcohol and other monoalcohols which have a molecular weight of up to 2000 and are prepared from ethylene oxide, propylene oxide and/or butylene oxide.

It is also possible in accordance with the present invention to use mixtures of the previously described monoalcohols.

When the polyisocyanates containing allophanate groups and optionally isocyanurate groups according to the invention are prepared from monoalcohols containing ethylene oxide units, the polyisocyanates may be dispersed in water as described in U.S. Pat. No. 5,200,489, the disclosure of which is herein incorporated by reference.

The process according to the invention may take place either batchwise or continuously, for example, as described below. The starting diisocyanate is introduced with the exclusion of moisture and optionally with an inert gas into a suitable stirred vessel or tube and optionally mixed with a solvent which is inert to isocyanate groups such as toluene, butyl acetate, diisopropylether or cyclohexane. The previously described isocyanate-reactive siloxane compounds and optional alcohols may be introduced into the reaction vessel in accordance with several embodiments. They may be prereacted with the starting diisocyanate to form urethane and optionally urea groups prior to introducing the diisocyanates into the reaction vessel; they may be mixed with the diisocyanates and introduced into the reaction vessel; they may be separately added to the reaction vessel either before or after, preferably after, the diisocyanates are added; or the catalyst may be dissolved in these compounds prior to introducing the solution into the reaction vessel.

At a temperature of about 50° C. and in the presence of the required catalyst or catalyst solution the allophanatization reaction begins and is indicated by an exothermic reaction. When catalysts for the formation of allophanate groups and isocyanurate groups are present, it is possible to control the rate of formation of the these two groups. As the reaction temperature increases the conversion rate of urethane groups to allophanate groups increases faster than the formation of isocyanurate groups. Accordingly, by varying the reaction temperature, it is possible to obtain different ratios of allophanate groups to isocyanurate groups.

The progress of the reaction is followed by determining the NCO content by a suitable method such as titration, refractive index or IR analysis. Thus, the reaction may be terminated at the desired degree of allophanatization. The termination of the allophanatization reaction can take place, for example, after the NCO content has fallen by 5 to 80% by weight, preferably 10 to 60% by weight and more preferably 20 to 50% by weight, based on the initial isocyanate group content of the diisocyanate starting material.

In general, when the reaction is terminated at a high NCO content, i.e., before the NCO content has been reduced significantly, the resulting polyisocyanate mixture after removal of unreacted starting diisocyanate will have a low viscosity. To the contrary if the reaction is terminated at a low NCO content, i.e., after the NCO content has fallen significantly, then the resulting product will have a higher viscosity due to the formation of polyisocyanurates and other higher molecular weight by-products of the isocyanurates and allophanates which are initially formed. This is especially true with regard to the known aliphatic diisocyanate starting materials. Cyclic diisocyanates result in extremely high viscosity products or solids after removal of unreacted monomer regardless of when the reaction is terminated.

The termination of the allophanatization and optionally trimerization reactions can take place, for example, by the addition of a catalyst poison of the type named by way of example in the above-mentioned literature references. For example, when using basic catalysts the reaction is terminated by the addition of a quantity, which is at least equivalent to the catalyst quantity, of an acid chloride such as benzoyl chloride. When using heat-labile catalysts, for example, certain quaternary ammonium hydroxides, poisoning of the catalyst by the addition of a catalyst-poison may be dispensed with, since these catalysts decompose in the course of the reaction. The use of suspended catalysts is also possible. These catalysts are removed after achieving the desired degree of trimerization by filtering the reaction mixture.

The working-up of the reaction mixture, optionally after previous separation of insoluble catalyst constituents, may take place in various ways depending upon how the reaction was conducted and the area of application for the isocyanates. Any solvent used during the reaction and any unreacted monomer present in the polyisocyanate product may be removed by distillation in known manner. The product obtained after distillation generally contains a total of less than 2% by weight, preferably less than 1% by weight, based on the solids content of the polyisocyanate mixture, of free (unreacted) monomeric diisocyanates. The products according to the invention range from low viscosity liquids having a viscosity of 200 mPa.s to high viscosity liquids to solids.

The low viscosity products are generally obtained from aliphatic diisocyanate starting materials, such as 1,6-hexamethylene diisocyanate and have a viscosity of less than 5000, preferably less than 2000 and more preferably less than 1300 mPa.s. High viscosity products may also be obtained from these diisocyanates, but the reaction is terminated at a significantly lower NCO content. The high viscosity products have a minimum viscosity of 5000, preferably 12,000 and more preferably 15,000 to 70,000 mPa.s and a maximum viscosity of 100,000, preferably 90,000 and more preferably 70,000 mPa.s. The viscosities are determined at 25° C. on samples having a solids content of 100% and containing less than 2% by weight of unreacted monomer. Extremely highly viscous to solid products are generally obtained from cyclic diisocyanates such as isophorone diisocyanate, bis-(4-isocyanato-cyclohexyl)-methane or the previously described aromatic diisocyanates.

The polyisocyanate mixtures obtained in accordance with the present invention have an average functionality of about 2 to 7, depending upon whether a low or high viscosity product is desired. The low viscosity products prepared from aliphatic diisocyanate starting materials have an average functionality of 2 to 4, preferably 2.2 to 3.3, and an NCO content of 10 to 35%, preferably 10 to 25% and more preferably 12 to 22%. The high viscosity products prepared from aliphatic diisocyanate starting materials have an average functionality of 3 to 7, preferably 3.5 to 6; an NCO content of 5 to 25%, preferably 10 to 17% and an equivalent weight which is at least 30% greater, preferably 40% greater and more preferably 50% greater, than the molecular weight of the monomeric isocyanate used to prepare the polyisocyanate mixture. The extremely highly viscous to solid products prepared from cyclic diisocyanate starting materials have an average functionality of 2 to 6 preferably 2.2 to 5, and an NCO content of 10 to 40%, preferably 12 to 25% by weight.

The polyisocyanate mixtures according to the invention have an isocyanurate group content (calculated as $N_3$, $C_3$, $O_3$, MW 126) of up to 25% by weight, preferably up to 20% by weight. When using allophanatization/trimerization catalysts, the polyisocyanate mixtures will generally have an isocyanurate group content of at least 5%, preferably at least 10% by weight. Even when using highly selective allophanatization catalysts, minor quantities of isocyanurate groups are formed. The polyisocyanate mixtures have an allophanate group content (calculated as $N_2,C_2,H,O_3$, MW 101) of at least 5%, preferably at least 10% by weight. The upper limit for the allophanate group content is 35%, preferably 30% by weight.

The polyisocyanate mixtures, which are prepared from aliphatic, cycloaliphatic or aralphatic diisocyanate starting materials, especially the low viscosity products prepared from aliphatic diisocyanate starting materials, may be almost colorless, i.e., they have a yellowness index as measured on the APHA color scale of 10 to 200, preferably 10 to 150 and more preferably 10 to 100.

In the low viscosity products prepared from aliphatic diisocyanate starting materials using allophanatization/trimerization catalysts, the ratio of monoisocyanurate groups to mono-allophanate groups in the polyisocyanates according to the invention is about 10:1 to 1:10, preferably about 5:1 to 1:7. These values may be determined by gel permeation chromatography (GPC) by determining the areas under the peaks for the monoisocyanurate and monoallophanate groups. In accordance with the present invention the term "monoisocyanurate" means a polyisocyanate containing one isocyanurate group and formed from three diisocyanate molecules, and the term "polyisocyanurate" means a polyisocyanate containing more than one isocyanurate group. The term "monoallophanate" means a polyisocyanate containing one allophanate group and formed from two diisocyanate molecules and 1 monoalcohol molecule, and the term "polyallophanate" means a polyisocyanate containing more than one allophanate group.

The products according to the present invention are polyisocyanates containing allophanate groups, siloxane groups, preferably in the form of dimethyl siloxane groups, and optionally isocyanurate groups. The products may also contain residual urethane groups which are not converted to allophanate groups depending upon the temperature maintained during the reaction and the degree of isocyanate group consumption. While it is preferred to convert at least 50%, preferably at least 70% and more preferably at least 90% of the urethane groups formed from the siloxane-containing hydroxyl compounds to allophanate groups, it is not necessary provided that the number of equivalents of allophanate groups exceeds the number of equivalents of urethane groups and provided that the polyisocyanate mixture contains sufficient allophanate groups to ensure that the polyisocyanate mixture remains stable and homogeneous in storage for 3 months at 25° C. if the polyisocyanate mixture contains an insufficient number of allophanate groups, the mixture may be cloudy and a gradual settling of insoluble constituents may take place during storage. For example, it might not be necessary to convert the urethane groups formed from the siloxane-containing hydroxyl compounds to allophanate groups when the polyisocyanate mixture contains allophanate groups formed from non-siloxane-containing monoalcohols as previously discussed.

The products according to the invention are valuable starting materials for the production of polyisocyanate polyaddition products by reaction with compounds containing at least two isocyanate reactive groups. The products according to the invention may also be moisture-cured to form coatings. Preferred products are one or two-component coating compositions, more preferably polyurethane coating compositions. When the polyisocyanates are unblocked, two-component compositions are obtained. To the contrary when the polyisocyanates are blocked, one-component compositions are obtained.

Prior to their use in coating compositions, the polyisocyanate mixtures according to the invention may be blended with other known polyisocyanates, e.g., polyisocyanate adducts containing biuret, isocyanurate, allophanate, urethane, urea, carbodiimide, and/or uretdione groups. The amount of the polyisocyanates mixtures according to the invention that must be blended with these other polyisocyanates is dependent upon the siloxane content of the polyisocyanates according to the invention, the intended application of the resulting coating compositions and the amount of low surface energy properties which are desired for this application.

To obtain low surface energy properties the resulting polyisocyanate blends should contain a minimum of 0.002% by weight, preferably 0.02% by weight and more preferably 0.2% by weight, of siloxane groups (MW 44), based on solids, and a maximum of 10% by weight, preferably 7% by weight and more preferably 3% by weight of siloxane groups (MW 44), based on solids. By knowing the siloxane content of the polyisocyanate mixtures according to the invention and the desired siloxane content of the resulting polyisocyanate blends, the relative amounts of the polyisocyanate mixtures and the other polyisocyanates may be readily determined.

In accordance with the present invention any of the polyisocyanate mixtures according to the invention can be blended with other polyisocyanates. However, preferably the polyisocyanate mixtures to be blended have a minimum siloxane content of 5% by weight, preferably 10% by weight and more preferably 20% by weight, and a maximum siloxane content of 50% by weight, preferably 45% by weight. These so-called "concentrates" may then be blended with other polyisocyanates to form polyisocyanate blends that may be used to prepare coatings having low surface energy characteristics.

Several advantages are obtained by preparing concentrates with high siloxane contents and subsequently blending them with non-siloxane-containing polyisocyanates. Initially, it is possible to convert many products to low surface energy polyisocyanates while only producing one concentrate. By forming such low surface energy polyisocyanates by blending commercially available polyisocyanates with concentrates, it is not necessary to separately prepare each of the products in both a siloxane-containing and a non-siloxane-containing form.

Secondly, it may not be necessary to remove unreacted starting diisocyanate following preparation of the concentrates. Commercially available polyisocyanates must contain very low amounts of unreacted starting diisocyanate as previously discussed. However, since only small amounts of concentrates with high siloxane contents need to be blended with non-siloxane-containing polyisocyanates to obtain low surface energy polyisocyanates, the required low levels of unreacted starting diisocyanate can be met without having to remove these monomers in a costly distillation step.

Preferred reaction partners for the products according to the invention are the polyhydroxy polyesters, polyhydroxy polyethers, polyhydroxy polyacrylates, polyhydroxy polylactones, polyhydroxy polyurethanes, polyhydroxy polyepoxides and optionally low molecular weight, polyhydric alcohols known from polyurethane coatings technology. Polyamines, particularly in blocked form, for example as polyketimines, oxazolidines or polyaldimines are also suitable reaction partners for the products according to the invention. Also suitable are polyaspartic acid derivatives (succinates) containing secondary amino groups, which also function as reactive diluents.

To prepare the coating compositions the amount of the polyisocyanate component and the isocyanate reactive component are selected to provide equivalent ratios of isocyanate groups (whether present in blocked or unblocked form) to isocyanate-reactive groups of about 0.8 to 3, preferably about 0.9 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diazabicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The products according to the invention are also valuable starting materials for one-component coating compositions, preferably polyurethane coating compositions, in which the isocyanate groups are used in a form blocked by known blocking agents. The blocking reaction is carried out in known manner by reacting the isocyanate groups with suitable blocking agents, preferably at an elevated temperature (e.g. about 40° to 160° C.), and optionally in the presence of a suitable catalyst, for example, the previously described tertiary amines or metal salts.

Suitable blocking agents include monophenols such as phenol, the cresols, the trimethylphenols and the tert. butyl phenols; tertiary alcohols such as tert. butanol, tert. amyl alcohol and dimethylphenyl carbinol; compounds which easily form enols such as acetoacetic ester, acetyl acetone and malonic acid derivatives, e.g. malonic acid diethylester; secondary aromatic amines such as N-methyl aniline, the N-methyl toluidine, N-phenyl toluidine and N-phenyl xylidine; imides such as succinimide; lactams such as ε-caprolactam and δ-valerolactam; pyrazoles such as 3,5-dimethyl pyrazole; oximes such as butanone oxime, methyl amyl ketoxime and cyclohexanone oxime; mercaptans such as methyl mercaptan, ethyl mercaptan, butyl mercaptan, 2-mercaptobenzthiazole, α-naphthyl mercaptan and dodecyl mercaptan; and triazoles such as 1H-1,2,4-triazole.

The polyisocyanate mixtures according to the invention may also be used as the polyisocyanate component in two-component water borne coating compositions. To be useful for in these compositions the polyisocyanate mixtures must be rendered hydrophilic either by blending with external emulsifiers or by a reaction with compounds containing cationic, anionic or non-ionic groups. Methods for rendering the polyisocyanates hydrophilic are disclosed in copending application, U.S. Pat. Nos. 5,194,487 and 5,200,489, the disclosures of which are herein incorporated by reference. The reduced surface tension of the modified polyisocyanate mixtures enhance pigment dispersion and substrate wetting.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the polyisocyanates according to the invention provide coatings which have good dry times, adhere surprisingly well to a metallic base, and are particularly light-fast, color-stable in the presence of heat and very resistant to abrasion. Furthermore, they are characterized by high hardness, elasticity, very good resistance to chemicals, high gloss, good weather resistance, good environmental etch resistance and good pigmenting qualities. Above all, the coating compositions have an excellent surface appearance and excellent cleanability.

The invention is further illustrated, but is not intended to be limited by the following examples in which all parts and percentages are by weight unless otherwise specified.

EXAMPLES

Alcohol 1

A butyl initiated, carbinol-terminated, polydimethylsiloxane alcohol having a molecular weight of about 1000 (available from Chisso Corp. as FM-0411).

Alcohol 2

A methyl initiated, carbinol-terminated, polydimethylsiloxane alcohol having a molecular weight of about 1000.

Polyisocyanate 1—According to the invention 100 parts of 1,6-hexamethylene diisocyanate (HDI) and 1.0 part of Alcohol 1 were added to a reactor equipped with a gas bubbler, stirrer, and thermometer and heated to 90° C. while dry nitrogen gas was bubbled through with stirring. To the stirred solution was added 2.02 parts of a 0.5% solution of trimethylbenzyl ammonium hydroxide catalyst dissolved in ethyl acetate. The addition of the catalyst solution was at such a rate that the reaction mixture was maintained at about 90° C. After the catalyst addition was complete, the reaction mixture was maintained at 90° C. for an additional 15 minutes and then 0.01 parts of di-(2-ethylhexyl)-phosphate was added. After termination of the reaction, a hazy solution was obtained having an NCO content of 40.3%. Residual monomeric HDI was removed by wiped thin-film evaporation and, after filtering (1 micron), a liquid allophanate-modified isocyanurate was obtained having the following properties:

| Viscosity | 4825 mPa · s at 25° C. |
|---|---|
| NCO content | 20.9% |
| free HDI monomer content | 3.1% |
| Siloxane content (SiO) | 0.71% |
| Liquid surface tension | 24.7 dynes/cm. |

Polyisocyanate 2 (Comparison)

An isocyanurate group-containing polyisocyanate prepared from 1,6-hexamethylene diisocyanate (HDI) (available from Bayer Corp. as Desmodur N-3300) and having the following properties:

| Viscosity | 3000 mPa · s at 25° C. |
|---|---|
| NCO content | 21.6% |
| Free HDI monomer content | <0.2% |
| Siloxane content (SiO) | 0% |
| Liquid surface tension | 48.6 dynes/cm. |

It is apparent by comparing the surface tension for Polyisocyanate 2 with that for Polyisocyanate 1 that the presence of siloxanes are necessary to obtain a low surface tension.

Polyisocyanate 3 (Comparison)

A polyisocyanate containing isocyanurate groups and allophanate groups was prepared by adding 301.7 parts of hexamethylene diisocyanate and 13.3 parts of 1-butanol to a 500 ml 3-neck flask equipped with a gas bubbler, mechanical stirrer, thermometer and condenser. The stirred mixture was heated for 1 hour at 60° C. while dry nitrogen was bubbled through the reaction mixture. The temperature of the reaction mixture was then raised to 90° C. To the reaction mixture at 90° C. were added 0.214 parts of a 4.4% solution of N,N,N-trimethyl-N-benzyl-ammonium hydroxide in 1-butanol. When the reaction mixture reached an NCO content of 34.8%, the reaction was stopped by adding 0.214 parts of di-(2-ethylhexyl)-phosphate. The excess monomer was removed by thin film evaporation to provide an almost colorless, clear liquid having the following properties:

| Viscosity | 630 mPa · s at 25° C. |
|---|---|
| NCO content | 19.7% |
| Free HDI monomer content | 0.35% |
| Siloxane content (SiO) | 0% |
| Liquid surface tension | 43.3 dynes/cm. |

It is apparent by comparing the surface tension for Polyisocyanate 3 with that for Polyisocyanate 1 that polyisocyanates containing allophanate groups, but which do not contain siloxane groups, are not suitable for the production of polyisocyanates with a low surface tension.

Polyisocyanate 4 (Comparison)

To a 3-neck flask equipped with a gas bubbler, mechanical stirrer, thermometer and condensor were added 490 parts of Polyisocyanate 2 and 10 parts of Alcohol 2. Dry nitrogen was bubbled through the stirred reaction mixture while it was heated at 50° C. After 11 hours at 50° C., the NCO content reached 20.8%. A white, opaque polyisocyanate containing urethane groups was obtained having the following properties:

| Viscosity | 3000 mPa · s at 25° C. |
|---|---|
| NCO content | 20.8% |
| Siloxane content (SiO) | 1.0% |

The polyisocyanate was not storage stable and phase separated over a period of 1 week at 25° C. This example, in which the siloxane groups were incorporated via urethane groups, demonstrates that it is necessary for the siloxane groups to be incorporated via allophanate groups as in Polyisocyanate 1 in order to obtain storage stable polyisocyanates that do not phase separate.

Polyisocyanate 5—According to the invention 100 parts of 4,4'-diphenylmethane diisocyanate (MDI), 5.4 parts of n-butanol and 0.5 parts of Alcohol 1 were added to a reactor equipped with a stirrer and thermometer. The reaction mixture was heated to 90° C. and then 50 ppm of zinc acetylacetonate was added. After about 1 hour the NCO content was 26.1% by weight. The reaction was terminated by the addition of 100 ppm of benzoyl chloride and the reaction mixture was cooled to 25° C. The resulting hazy, light yellow polyisocyanate mixture containing allophanate groups had the following properties:

| Viscosity | 92 mPa · s at 25° C. |
|---|---|
| NCO content | 26.1% |
| Siloxane content (SiO) | 0.15% |
| Liquid surface tension | 24.0 dynes/cm. |

Polyisocyanate 6 (Comparison)

To a 3-neck flask equipped with a gas bubbler, mechanical stirrer, thermometer and condenser were added 100 parts of MDI and 5.4 parts of 1-butanol. Dry nitrogen was bubbled through the stirred reaction mixture while it was heated at 90° C. After 2 hours at 90° C., 50 ppm of zinc acetylacetonate was added in one portion. When the NCO content reached 26.0%, the reaction was stopped by adding 100 ppm of benzoyl chloride, and cooled to 25° C. The resulting light yellow polyisocyanate had the following properties:

| Viscosity | 72 mPa · s at 25° C. |
|---|---|
| NCO content | 26.0% |
| Siloxane content (SiO) | 0% |
| Liquid surface tension | 48.7 dynes/cm. |

It is apparent by comparing the surface tension for Polyisocyanate 5 with that for Polyisocyanate 6 that polyisocyanates containing allophanate groups, but which do not contain siloxane groups, are not suitable for the production of polyisocyanates with a low surface tension.

Polyisocyanate 7—According to the invention

To a 3-neck flask equipped with a gas bubbler, mechanical stirrer, thermometer and condensor were added 105 parts of hexamethylene diisocyanate (HDI), 54 parts of Alcohol 1 and 13 parts of n-butanol. Dry nitrogen was bubbled through the stirred reaction mixture while it was heated at 120° C. After 90 minutes at 120° C., 174 ppm of stannous octoate was added dropwise over a 90 minute period. When the NCO content reached 17.1%, the reaction was stopped by adding 180 ppm of benzoyl chloride. A clear polyisocyanate was obtained that had the following properties:

| NCO content | 17.1% |
|---|---|
| Free HDI monomer content | 20.5% |
| Siloxane content (SiO) | 15.2% |

Polyisocyanate 8—According to the invention 3.2 parts of Polyisocyanate 7 were diluted with 96.8 parts of Polyisocyanate 2 to produce a clear polyisocyanate having the following properties:

| Viscosity: | 3000 mPa · s at 25° C. |
|---|---|
| NCO content | 18.8% |
| Free HDI monomer content | 0.7% |
| Siloxane content (SiO) | 0.6% |
| Liquid surface tension | 24.4 dynes/cm |

EXAMPLE 1—According to the invention

A coating composition was prepared by mixing a hydroxyl-functional polyacrylate/polyester having a solids content of 70% solids in n-butyl acetate and an equivalent weight of 607 (Desmophen 2945, available from Bayer Corp.) with Polyisocyanate 1 at an NCO:OH equivalent ratio of 1.1:1. The composition was reduced to 70% solids with a solvent mixture containing Exxate 700 (an ester based solvent available from Exxon), n-butyl acetate and methyl amyl ketone (1:4:1) and allowed to react for five minutes. At that time, a 5 mil wet film thickness drawdown on glass was prepared and allowed to cure for two weeks at 70° F. and 55% relative humidity. The resulting coating was clear and had a surface energy of 25 dynes/cm.

EXAMPLE 2 (Comparison)

Example 1 was repeated with the exception that Comparison Polyisocyanates 2 and 3 were separately used in place of Polyisocyanate 1. The resulting coatings were clear, but had a surface energies of 43.7 and 43.6 dynes/cm, respectively.

It is apparent by comparing these surface energies with the surface energy from Example 1 that it is necessary for the polyisocyanate component to contain both allophanate groups and siloxane groups to obtain coatings having low surface energies.

EXAMPLE 3 (Comparison)

A coating composition was prepared by mixing the hydroxyl-functional polyacrylate/polyester described in Example 1 with Comparison Polyisocyanate 4 at an NCO:OH equivalent ratio of 1.1:1. The formulation was reduced to 70% solids with the solvent blend described in Example 1 and allowed to react for five minutes. At that time, a 5 mil wet film thickness drawdown on glass was prepared and allowed to cure for two weeks at 70° F. and 55% relative humidity. The resulting coating was hazy and had a surface energy of 28.4 dynes/cm. Due to its haziness, this coating would not be suitable for many coatings applications.

This example demonstrates that it is necessary for the siloxane groups to be incorporated via allophanate groups as in Examples 1 and 4, and not via urethane groups, in order to obtain clear coatings.

EXAMPLE 4—According to the invention 90 parts of a hydroxy-functional polyester having a solids content of 100% and an equivalent weight of 340 (Desmophen 1150, available from Bayer Corp. ) was blended with 10 parts of a drying paste (Baylith L, available from Bayer Corp.) and allowed to digest overnight. A coating composition was prepared by mixing this blend with Polyisocyanate 5 at an NCO:OH equivalent ratio of 1.05:1. The composition was allowed to digest for a period of five minutes and then a 5 mil wet film thickness drawdown on cold rolled steel was prepared and allowed to cure for two weeks at 70° F. and 55% relative humidity. A clear, light brown coating was obtained that had a surface energy of 28.7 dynes/cm.

EXAMPLE 5 (Comparison)

Example 4 was repeated with the exception that Comparison Polyisocyanate 6 was used in place of Polyisocyanate 5. The resulting coating was clear, but had a surface energy of 41.6 dynes/cm.

It is apparent by comparing this surface energy with the surface energy from Example 4 that it is necessary for the polyisocyanate component to contain both allophanate groups and siloxane groups to obtain coatings having low surface energies.

EXAMPLE 6—According to the invention

A coating composition was prepared by mixing the hydroxyl-functional polyacrylate/polyester described in Example 1 with Polyisocyanate Example 8 at an NCO:OH equivalent ratio of 1.1:1. The formulation was reduced to 70% solids with the solvent blend described in Example 1 and allowed to react for five minutes. At that time, a 5 mil wet film thickness drawdown on glass was prepared and allowed to cure for two weeks at 70° F. and 55% relative humidity. The resulting coating was clear and had a surface energy of 29 dynes/cm.

Surface Tension and Surface Energy Measurements

All reported liquid (resin) surface tensions (in dynes/cm) were obtained, using the ring or duNouy method. In this static method, the force applied on a thin platinum ring was measured using a tensiometer.

All reported solid (film) surface energies (in dynes/cm) were obtained by the Owens-Wendt procedure. The contact angle of two solvents (water and methylene iodide) were measured with a goniometer. Several readings were taken and averaged. The averages were then used to calculate the solid surface energy of the coating, taking into account the contributions of polar and dispersive forces.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture
   i) having an NCO content of 5 to 35% by weight and prepared from an organic diisocyanate,
   ii) containing up to 25% by weight of isocyanurate groups (calculated as $N_3$, $C_3$, $O_3$, MW 126),
   iii) containing allophanate groups in an amount such that there are more equivalents of allophanate groups than urethane and urea groups and such that the polyisocyanate mixture remains stable and homogeneous in storage for 3 months at 25° C., provided that the maximum content of allophanate groups is 35% by weight, and
   iv) containing siloxane groups (calculated as SiO, MW 44) in an amount of 0.002 to 50% by weight,
   wherein the preceding percentages are based on the solids content of the polyisocyanate mixture, excluding any unreacted organic diisocyanate, and wherein the siloxane groups are incorporated by reacting an isocyanate group with a compound containing one isocyanate-reactive group directly attached to a carbon atom and one or more siloxane groups.

2. The polyisocyanate mixture of claim 1 wherein said organic diisocyanate comprises 1,6-hexamethylene diisocyanate.

3. The polyisocyanate mixture of claim 1 which contains less than 10% by weight, based on solids, of siloxane groups.

4. The polyisocyanate mixture of claim 2 which contains less than 10% by weight, based on solids, of siloxane groups.

5. The polyisocyanate mixture of claim 1 which has a viscosity of less than 5000 mPa.s at 25° C. and a siloxane group content of 20 to 50% by weight.

6. The polyisocyanate mixture of claim 2 which has a viscosity of less than 5000 mPa.s at 25° C. and a siloxane group content of 20 to 50% by weight.

7. The polyisocyanate mixture of claim 1 which has an isocyanurate group content of at least 5% by weight, based on solids.

8. The polyisocyanate mixture of claim 2 which has an isocyanurate group content of at least 5% by weight, based on solids.

9. The polyisocyanate mixture of claim 3 which has an isocyanurate group content of at least 5% by weight, based on solids.

10. The polyisocyanate mixture of claim 4 which has an isocyanurate group content of at least 5% by weight, based on solids.

11. The polyisocyanate mixture of claim 5 which has an isocyanurate group content of at least 5% by weight, based on solids.

12. The polyisocyanate mixture of claim 6 which has an isocyanurate group content of at least 5% by weight, based on solids.

13. A polyisocyanate mixture
   i) having an NCO content of 5 to 35% by weight, based on solids, and prepared from an organic diisocyanate,
   ii) containing up to 25% by weight, based on solids, of isocyanurate groups (calculated as $N_3$, $C_3$, $O_3$, MW 126),
   iii) containing allophanate groups in an amount such that there are more equivalents of allophanate groups than urethane and urea groups and such that the polyisocyanate mixture remains stable and homogeneous in storage for 3 months at 25° C., provided that the maximum content of allophanate groups is 35% by weight, and
   iv) containing siloxane groups (calculated as SiO, MW 44) in an amount of 0.002 to 50% by weight, based on solids,
   wherein the preceding percentages are based on the solids content of the polyisocyanate mixture, excluding any unreacted organic diisocyanate, and wherein the siloxane groups are incorporated by reacting an isocyanate group with a compound containing one hydroxyl group directly attached to a carbon atom and one or more siloxane groups in the form of $-Si(CH_3)_2O-$ groups to form urethane groups.

14. The polyisocyanate mixture of claim 13 wherein said organic diisocyanate comprises 1,6-hexamethylene diisocyanate.

15. The polyisocyanate mixture of claim 13 which contains less than 10% by weight, based on solids, of siloxane groups.

16. The polyisocyanate mixture of claim 14 which contains less than 10% by weight, based on solids, of siloxane groups.

17. The polyisocyanate mixture of claim 13 which has a viscosity of less than 5000 mPa.s at 25° C. and a siloxane group content of 20 to 50% by weight.

18. The polyisocyanate mixture of claim 14 which has a viscosity of less than 5000 mPa.s at 25° C. and a siloxane group content of 20 to 50% by weight.

19. A process for the production of a polyisocyanate mixture
   i) having an NCO content of 5 to 35% by weight and prepared from an organic diisocyanate, ii) containing up to 25% by weight of isocyanurate groups (calculated as $N_3$, $C_3$, $O_3$, MW 126), iii) containing allophanate groups in an amount such that there are more equivalents of allophanate groups than urethane and urea groups and such that the polyisocyanate mixture remains stable and homogeneous in storage for 3 months at 25° C., provided that the maximum content of allophanate groups is 35% by weight, and iv) containing siloxane groups (calculated as SiO, MW 44) in an amount of 0.002 to 50% by weight, wherein the preceding percentages are based on the solids content of the polyisocyanate mixture, excluding any unreacted organic diisocyanate, by a) reacting a portion of the isocyanate groups of an organic diisocyanate with 0.01 to 500 millimoles, per mole of organic diisocyanate, of a compound containing one isocyanate-reactive group directly attached to a carbon atom and one or more siloxane groups and optionally a non-siloxane-containing monofunctional or polyfunctional alcohol to form urethane and optionally urea groups, provided that at least one of the isocyanate-reactive compounds contains hydroxyl groups, b) adding an allophanatization catalyst and optionally a trimerization catalyst prior to, during or after step a), c) converting a sufficient amount of the urethane groups formed in step a) to allophanate groups to satisfy the requirements of iii), d) terminating the allophanatization and trimerization reaction at the desired NCO content by adding a catalyst poison and/or by thermally deactivating the catalyst and e) optionally removing unreacted organic diisocyanate.

20. A one- or two-component coating composition containing the polyisocyanate mixture of claim 1, optionally blocked by blocking agents for isocyanate groups, and a compound containing isocyanate-reactive groups.

* * * * *